United States Patent [19]

Mori et al.

[11] Patent Number: 4,627,055
[45] Date of Patent: Dec. 2, 1986

[54] DECENTRALIZED PROCESSING METHOD AND SYSTEM

[75] Inventors: Kinji Mori, Yokohama; Makoto Nohmi; Shoji Miyamoto, both of Kawasaki; Hirokazu Ihara, Machida, all of Japan

[73] Assignee: Hitachi, Ltd., Tokyo, Japan

[21] Appl. No.: 570,502

[22] Filed: Jan. 13, 1984

[51] Int. Cl.[4] .................................................. G06F 11/00
[52] U.S. Cl. .................................... 371/16; 364/200; 371/8; 371/11
[58] Field of Search ............................ 371/11, 9, 8, 16; 364/200

[56] References Cited

U.S. PATENT DOCUMENTS

| Re. 28,958 | 9/1976 | Zafiropulo et al. | 371/11 X |
|---|---|---|---|
| 4,231,015 | 10/1980 | Union | 371/11 X |
| 4,354,267 | 10/1982 | Mori et al. | 371/11 |
| 4,374,436 | 2/1983 | Armstrong | 371/11 |
| 4,392,199 | 7/1983 | Schmitter et al. | 364/200 |
| 4,402,082 | 8/1983 | Cope | 371/11 X |
| 4,498,082 | 2/1985 | Aldridge et al. | 371/11 X |

*Primary Examiner*—Charles E. Atkinson
*Attorney, Agent, or Firm*—Antonelli, Terry & Wands

[57] ABSTRACT

A decentralized processing system having a plurality of subsystems of the same type which are connected to one another. Each subsystem has a diagnosis means for diagnosis of failure in other subsystems, and functions to take a suitable countermeasure in response to the result of the diagnosis. When a failure has occurred in any one of the subsystems constituting the processing system, each subsystem can conduct a suitable fault time processing in accordance with the state of the failure. After the recovery from the failure, each system can execute a processing for recovering the ordinary status. The subsystems can correspond with each other to conduct the processings in synchronization as required. It is, therefore, possible to attain synchronous operation of two or more subsystems in various control systems or the like.

14 Claims, 25 Drawing Figures

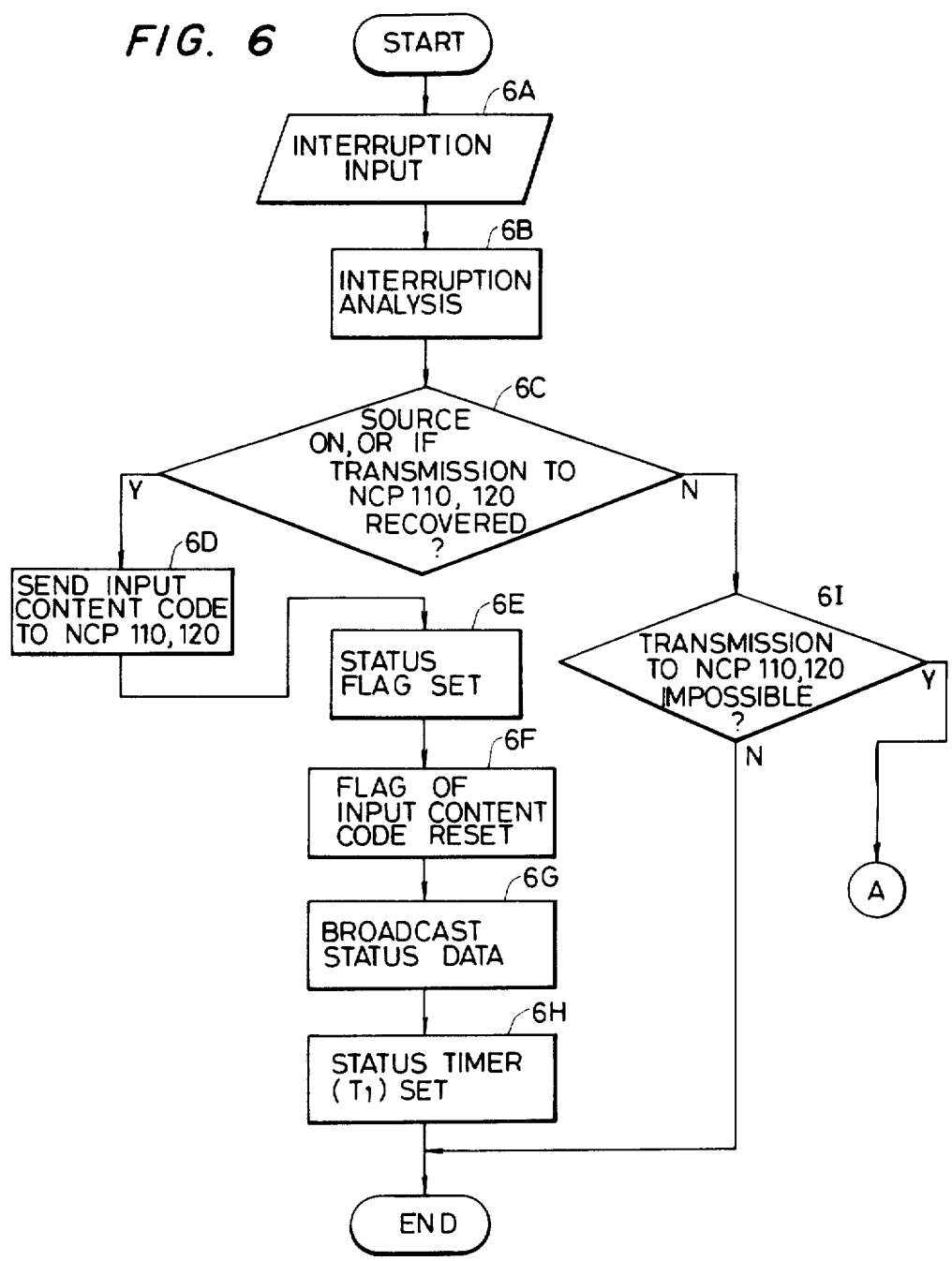

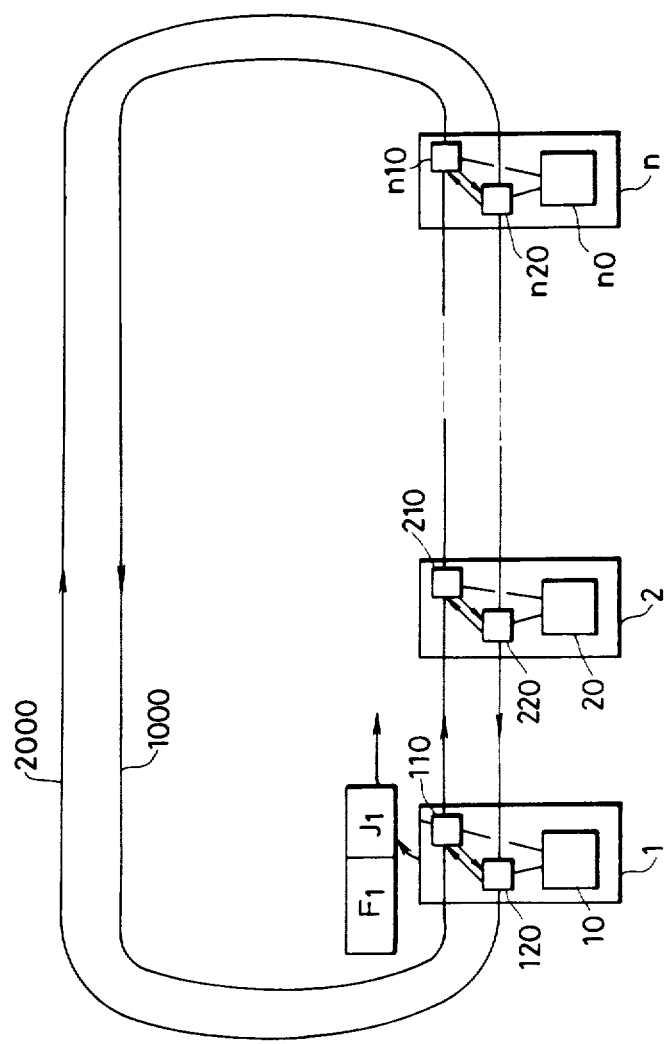

DECENTRALIZED PROCESSING METHOD AND SYSTEM

BACKGROUND OF THE INVENTION

1. Field of the Invention

The present invention relates to a decentralized processing system having a plurality of subsystems connected thereto. More particularly, the invention is concerned with a decentralized processing system capable of taking a suitable countermeasure upon detection of a failure in any of the subsystems and is improved to allow the subsystems to perform linked processing in relation to one another.

2. Description of the Prior Art

Previously, operation in response to a failure and linked processing in a decentralized processing system has been conducted by a hierarchical control system in which a specific subsystem conducts such processings in a centralized manner. Such a control system, however, suffers from a disadvantage that any failure in the specific subsystem causes malfunction of all subsystems under the control of such specific subsystem.

A transmission system in which a plurality of subsystems have self diagnosis functions has been proposed to obviate the above-described problem. The known transmission system, however, is not arranged to operate in response to a failure occurring in any of the subsystems nor to allow linked processings of the subsystems in relation to one another.

SUMMARY OF THE INVENTION

Accordingly, an object of the invention is to provide a decentralized processing system in which each subsystem has a function to detect a failure occurring in any one of the subsystems and to take a suitable countermeasure in accordance with the situation, and in which the subsystems can perform linked processings in relation to one another, thereby to obviate the above-described problems of the conventional decentralized processing system.

To this end, according to the invention, there is provided a decentralized processing system having a plurality of subsystems of the same order and connected to one another, wherein the improvement comprises that each subsystem has a diagnosis means for diagnosis of failure in other subsystems, and functions to take a suitable countermeasure in response to the result of the diagnosis, each of the subsystems further having means for controlling the application programs in synchronism with one another.

BRIEF DESCRIPTION OF THE DRAWINGS

FIGS. 6 and 7 are illustrations of the contents of the processing;

FIGS. 18 and 19 are illustrations of synchronous control processings; and

DESCRIPTION OF THE PREFERRED EMBODIMENTS

Preferred embodiments of the invention will be described herinunder with reference to the accompanying drawings.

Figure 1:
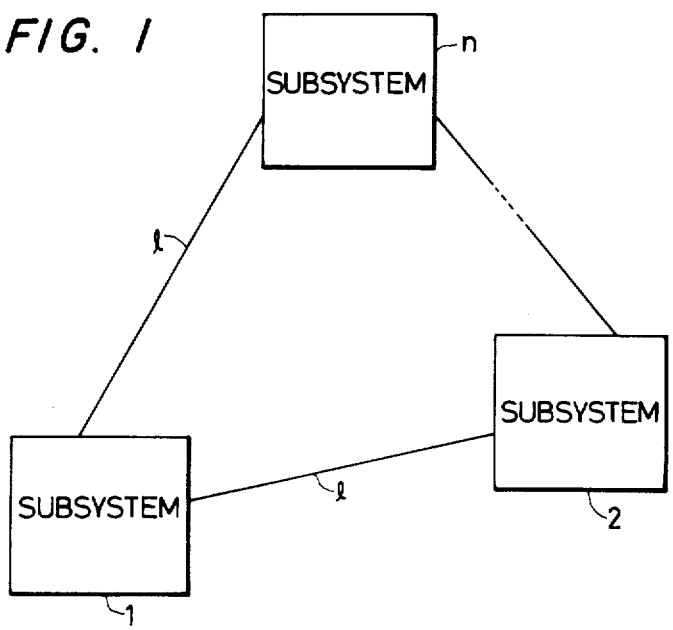
FIG. 1 is an illustration of the concept of the invention.

Referring first to FIG. 1 showing the concept of an embodiment of the invention, a plurality of subsystems (1st to nth subsystems) are connected through transmission lines 1. The subsystems 1 to n have transmission functions for exchanging information with one another and application control functions $F_1$ to $F_2$ for operating the plants in accordance with the acquired informations. Each of the subsystems is so constructed as not to be ordered by other subsystems and, in the event of a failure in one of other subsystems, to effect a self-protection thereby to avoid any malfunction thereof.

Figure 2:
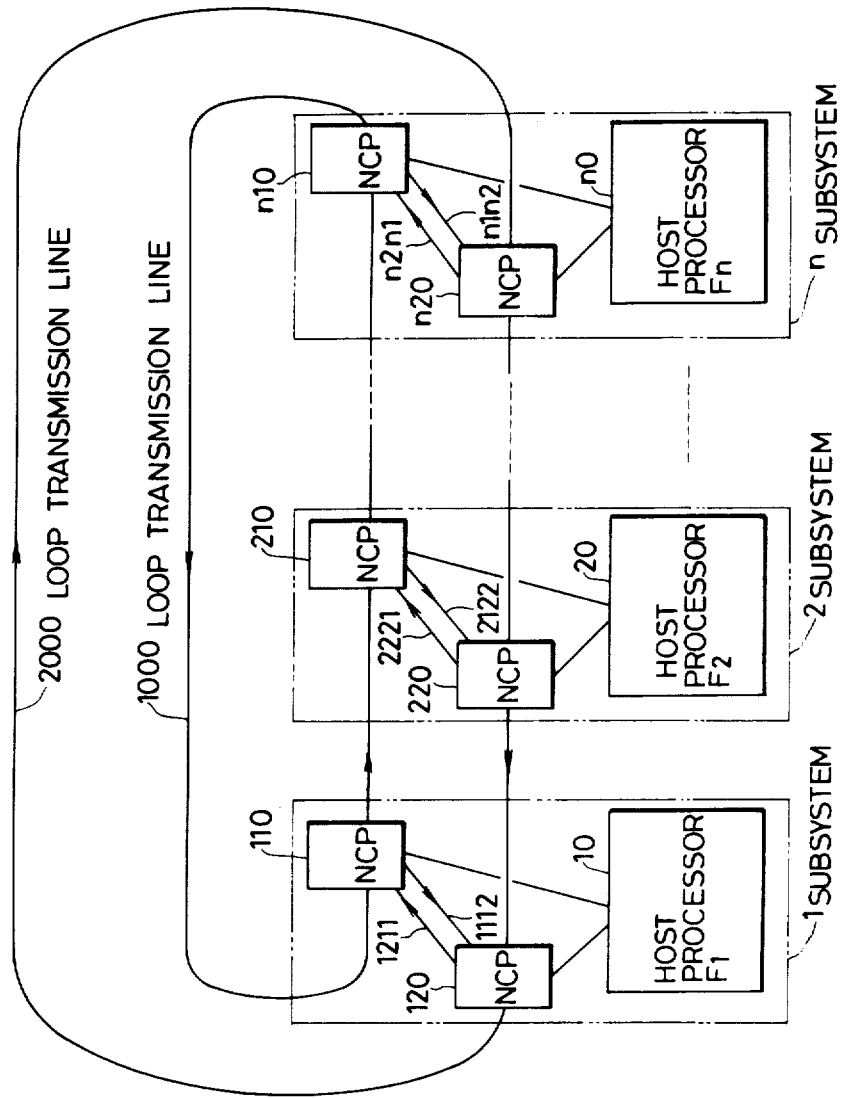
FIG. 2 is an illustration of a practical form of the invention.

FIG. 2 shows a practical example of the invention. As will be seen from this Figure, a plurality of subsystems are connected in the form of a closed loop. More specifically, the subsystems 1 to n are connected through double transmission lines 1000 and 2000. These transmission lines, referred to also as "loops" have opposite directions of transmission. The subsystems 1 to n are adapted to conduct the transmission and receipt of data through these loops 1000,2000 and via transmission controllers 110,210, . . . , n10; 120,220, . . . ,n20. The pairs of transmission controllers 110,120; 210,220; . . . ,n10, n20 are connected to respective host processors 10,20, . . . ,n0. The transmission controllers have functions to conduct transmission of information between the subsystems, while the host processors have functions $F_1,F_2,\ldots,F_n$ for controlling the plants. The transmission controllers of respective pairs are connected through bypass rountes 1112,1211 and so forth for bypassing the defective part on the transmission line.

Figure 3:
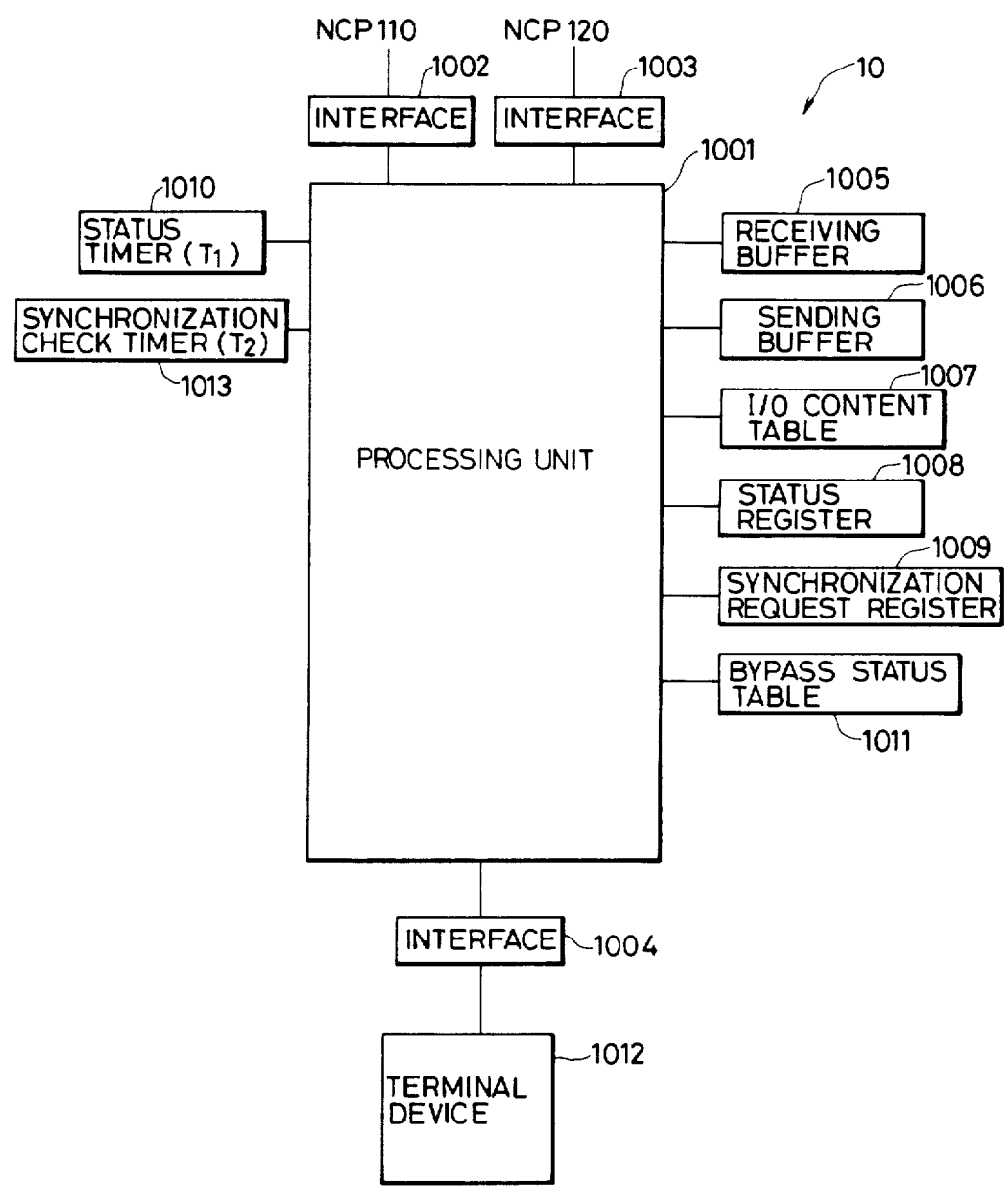
FIG. 3 is a block diagram of a host processor.

FIG. 3 shows the detail of the host processor 10. As will be seen from this Figure, the host processor 10 is constituted by various parts such as a processing unit 1001, interfaces 1002,1003 for connection to transmission controllers 110,120, a terminal device 1012 and an interface 1004 between the terminal device 1012 and the processing unit, a receiving buffer 1005 for storing messages received from the transmission controllers 110,120 and the terminal device 1012, a sending buffer 1006 for storing messages to be sent to the transmission controllers 110,120 and the terminal device 1012, an I/O content code table 1007 for showing the relationship between the input necessary for the operation of the aforesaid control functions and the output which is the result of operation of the control functions, a status register 1008 showing the status of the host processor, a synchronization request register 1009 showing that the operation is being started in synchronization with another subsystem, a synchronization check timer ($T_2$) 1013 showing the time elapsed after the synchronization request, a status timer ($T_1$) 1010 showing the time lapsed after the start of status setting of the host processor, and the bypass status table 1011 showing the presence or absence of a bypass in the bypass status table.

Figure 4:
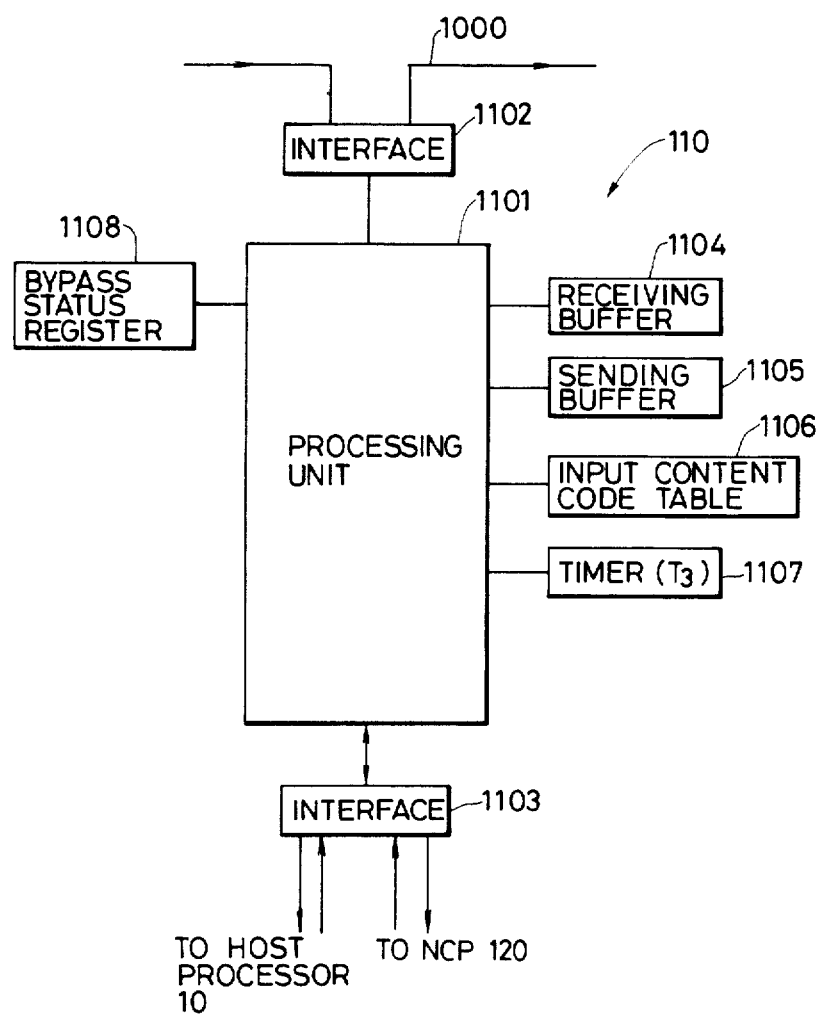
FIG. 4 is a block diagram of an NCP.

FIG. 4 shows the detail of the transmission controller 110 referred to as "NCP", hereinunder. The transmission controller 110 is composed of a processing unit 1101, an interface 1102 for connection to the loop transmission line 1000, an interface 1103 for connection to the host processor 10 and the counterpart NCP 120, a receiving buffer 1104 for storing messages received from the loop transmission line 1000 and the counterpart NCP 120, a sending buffer 1105 for storing the messages received from the host processor 10, an input content code table 1106 for storing the content code of the message which is to be delivered to the NCP, and a timer (T$_3$) 1107 for observing any failure in the transmission.

The operation of this embodiment will be described hereinunder.

The operation of this embodiment includes the following two functions.

(1) Detection of failure and fault time processing in response to detection of failure.

Each host processor is adapted to detect that the information exchange is impaired due to a failure in the transmission system or other host processor, and to conduct a fault time processing for the application control in accordance with the state of trouble.

(2) Synchronous control

Each host processor effects the control of the application program in synchronism with the operation of the application programs of other host processors.

A detailed description will be made hereinunder as to these two functions.

(1) Detection of failure and fault time processing

Figure 5:
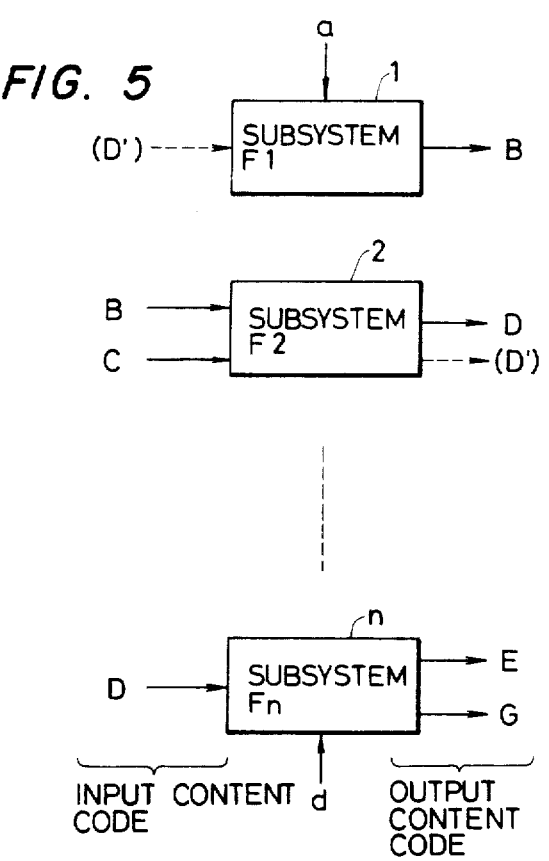
FIG. 5 is an illustration of example of the function of each sub-system.

The subsystems 1,2, . . . ,n have identical transmission functions but the control functions differ depending on the object of the control. FIG. 5 shows an example of the relationships between the control functions $F_1, F_2, \ldots, F_n$ of respective subsystems 1,2, . . . ,n and the I/O data. Namely, the function $F_1$ of the subsystem 1 receives a data having a content a from the terminal device 1012 connected thereto and delivers a data having a content B. The function $F_2$ of the subsystem 2 receives a data of a content B and a data of a content C through the loop transmission lines and delivers the data of a content D. Similarly, the function $F_n$ of the subsystem n receive a data of a content D transmitted through the loop transmission line and a data of a content d delivered by the terminal device connected thereto, and delivers data of contents E and G. Each of the sub-systems 1,2, . . . ,n is adapted to start a fault time processing program to conduct a fault time processing of the plant, in the case of a failure in which it cannot receive the prescribed data. It is also possible to arrange, as is the case of the function $F_2$ of the subsystem 2 shown in FIG. 5, to produce a data of a content D' different from the normal one as a result of the fault time processing, thereby to enable the subsystem 1 to judge the occurrence of any failure in the system and to conduct the fault time processing.

Figure 7:
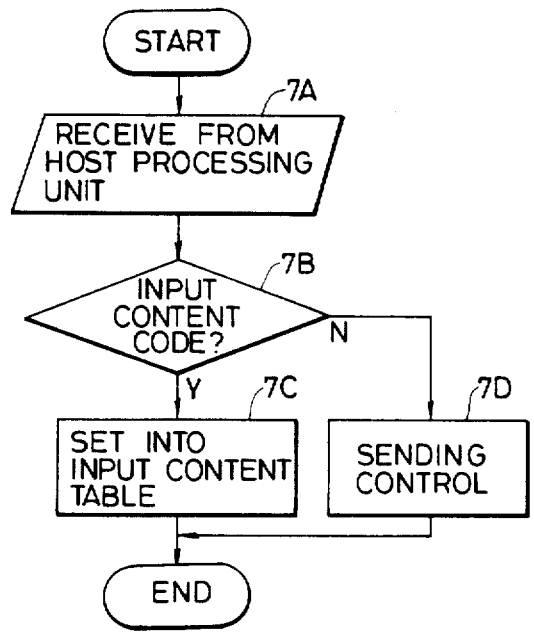

The content of the processing performed by the host processor for realizing the above-described function and the content of the processing performed by the NCP are shown in FIGS. 6 and 7, respectively.

The host processor 10 is allowed to make a data exchange with the host processors of other subsystems when the power supply source to the host processor is turned on or when it is permitted to send and receive signals to and from the NCPs 110 and 120.

Upon receipt of an interruption input (6A) from the power source, interfaces 1002,1003,1004 or the timer 1010, the host processor conducts an interruption analysis (6B) and makes a check (6C) as to whether the interruption input is caused by the turning on of the power source or by the recovery of the transmission to the NCPs 110,120. Upon confirming that the interruption input is caused by the turning on of the power source or the recovery of the transmission to the NCP 110 or 120, the host processor 10 prepares for the data exchange with other subsystems. To this end, the host processor 10 delivers the content code of the input data required by the host processor 10 from the I/O content code table 1007 to the NCPs 110,120 to register the same in the latter (6D).

In order to store the status of the system as a whole and to know what kind of input is available, the status flag in the status register 1008 is set at (6E) to show that the register itself is in the status setting state. At the same time, the flag of the input content code in the I/O content code table 1007 showing the available input is reset (6F), thereby to inform other subsystems of the fact that the present host processor is ready for the setting of the status (6G), and the status timer (T$_1$) is set (6H).

The foregoing description made in connection with FIG. 6 is focussed to the subsystem 1. However, it will be clear to those skilled in the art that the same operation applies also to other systems.

On the other hand, when the data is delivered (7A) from the host processor 10 to the NCP 110 (120), the NCP 110 (120) stores this data in the receiving buffer 1104 and conducts a check (7B) to determine whether this data is of the input content code required by the host processor 10. If the input code of this data is the required one, this data is stored at (7C) in the input content code table 1106. If the content code of this data is not the required one, this data is sent (7D) to the loop through the interface 1102. However, if the NCP is forming a bypass route due to a failure in the transmission line, the data is transmitted to the counterpart NCP 120 through the interface 1103 and is sent therefrom to the loop 2000.

The foregoing description taken in conjunction with FIG. 7 is focussed on the subsystem 1. Needless to say, however, the same description applied equal to other subsystems.

Figure 8:
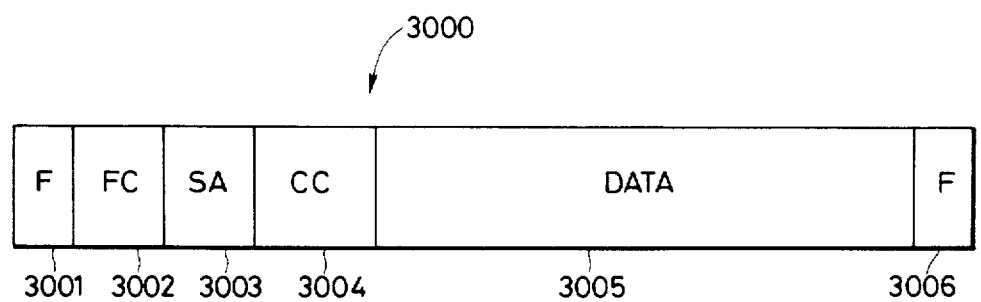
FIG. 8 is an illustration of a message format.

FIG. 8 shows the message format used when the data is sent from the NCP to the loop. A flag F 3001 is attached to the head of the message. The message includes also the content code (FC) 3002 representing the content of the data, address (SA) 3003 of the NCP as the source of the message, a control code (CC) 3004 consisting of three components of the serial No. showing the No. of the message produced by the NCP, a bypass code showing whether the message has passed through the bypass route during passing through the loop transmission line, and the number of passages of the message through the bypass route, data 3005, and the flag (F) 3006 representing the tail end of the message. The data exchange between the host processor 10 and the NPC 110,120 is conducted by a format which is obtained by neglecting the flag 3001, source address 3003, control code 3004 and the flag 3006 from the message format 3000.

Figure 9:
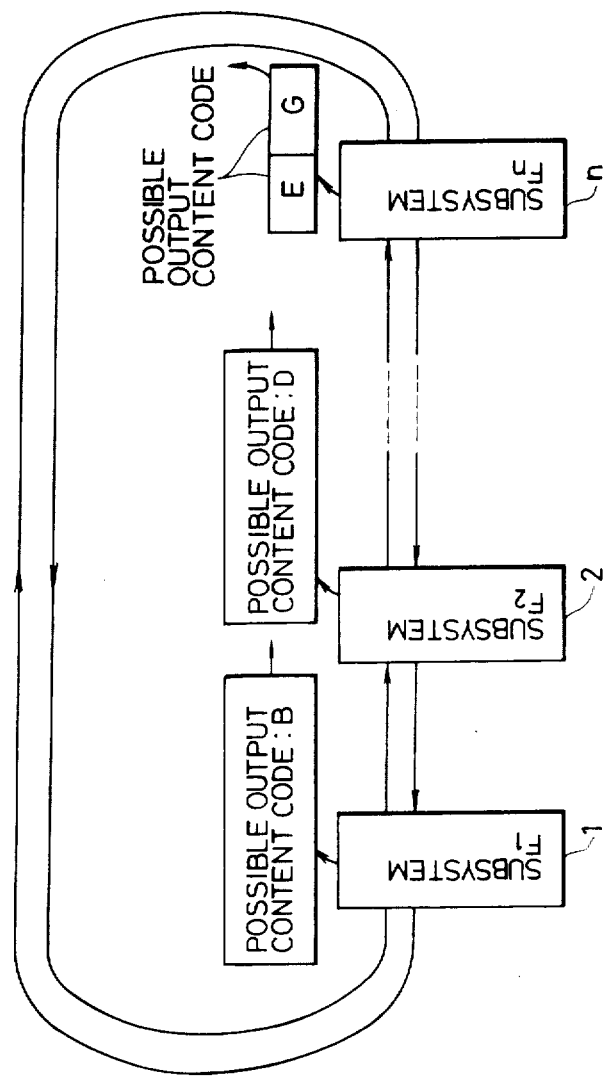
FIGS. 9 to 13 are illustrations of processings in response to a failure.

The host processor 10 and other host processors 20 to n0 which have been informed by the host processor 10 that the latter is ready for the setting of the status send out the available output content codes (see FIG. 5) successively as shown in FIG. 9. Namely, the host processor 10 of the subsystem 1 is ready for outputting the content code B by its function $F_1$, provided that it judges that its terminal device 1012 is in normal state and the data a is available. Accordingly, the host processor 10 sends the content code B to the transmission line. The host processor 20 of the subsystem 2 judges that it can perform the function $F_2$, provided that it receives the content code C from another subsystem in addition to the above-mentioned content code B. The host processor n0 of the subsystem n which has received the content code D is ready for outputting the content codes E and G by the function $F_n$, if it judges that its terminal device n012 is in normal state and the data of content code d is available. In this state, the host processor n0 sends the content codes E and G to the transmission line. Thus, the host processors of respective subsystems can know that they can safely perform their functions.

Figure 10:
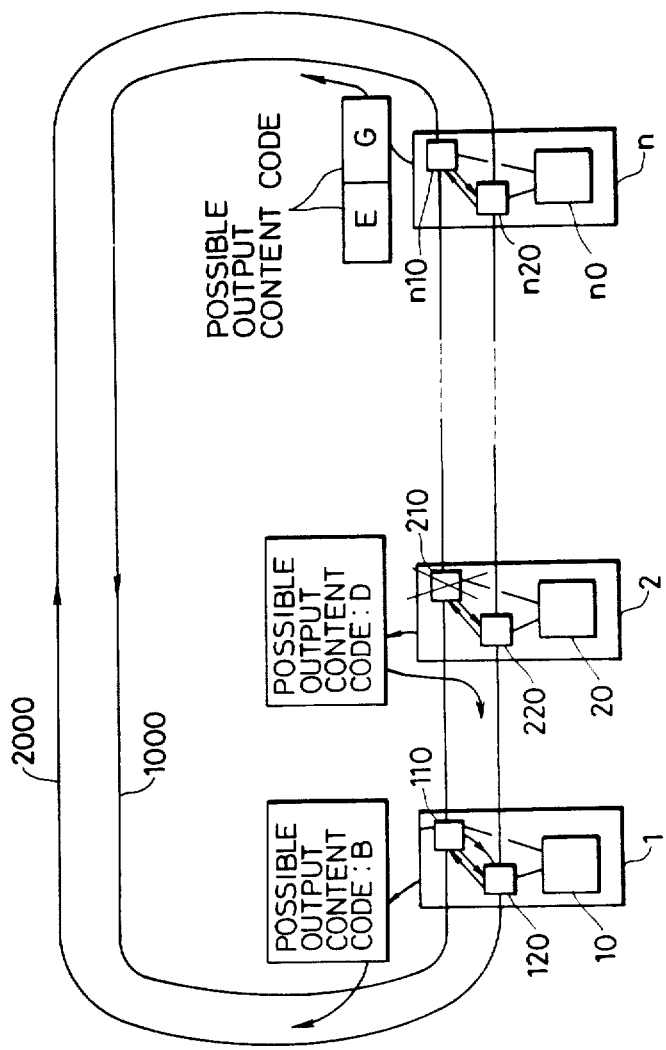

Referring now to FIG. 10, assume here that a failure is taking place in the NCP 210 of the subsystem 2. In this case, the NPC 110 of the subsystem 1 judges that the data cannot be sent towards the failed NCP 210, and forms a bypass route while generating information representing the formation of the bypass route. The host processors thus informed of the formation of the bypass route judge that the system is now in the state for setting the status and deliver the available output content codes successively in the same manner as that described before. In this case, the NCP 220 is safe although the NCP 210 of the subsystem 2 is failed. It is, therefore, possible to make the data exchange through the NCP 220, so that all of the functions $F_1$ to $F_n$ are executable.

Assume here that both of two NCPs 210 and 220 of the subsystem 2 are failed. In this case, the NCPs 110 and 320 at both sides of the subsystem 2 form bypass routes and gives informations representing he formation of these bypass routes. The host processors which have received such informations then send available output content codes. Namely, the host processor 10 of the subsystem 1 delivers the output content code B. On the other hand, the host processor n0 of the subsystem n, which is unable to receive the input content code D, conducts a fault time processing. If the host processor 20 of the subsystem 2 has judged that the data transmission towards the NCP210 and 220 is impossible (see 6I in FIG. 6), the host processor 20 conducts an abnormality processing as it judges that the required input content codes B and C are not available.

Figure 11:
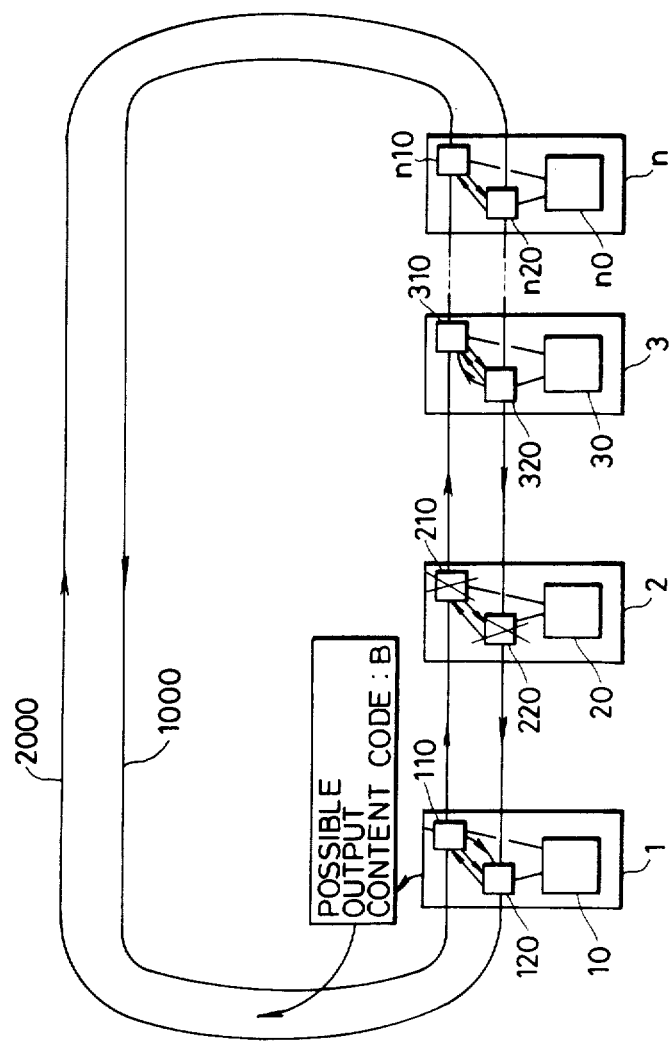
Figure 12:
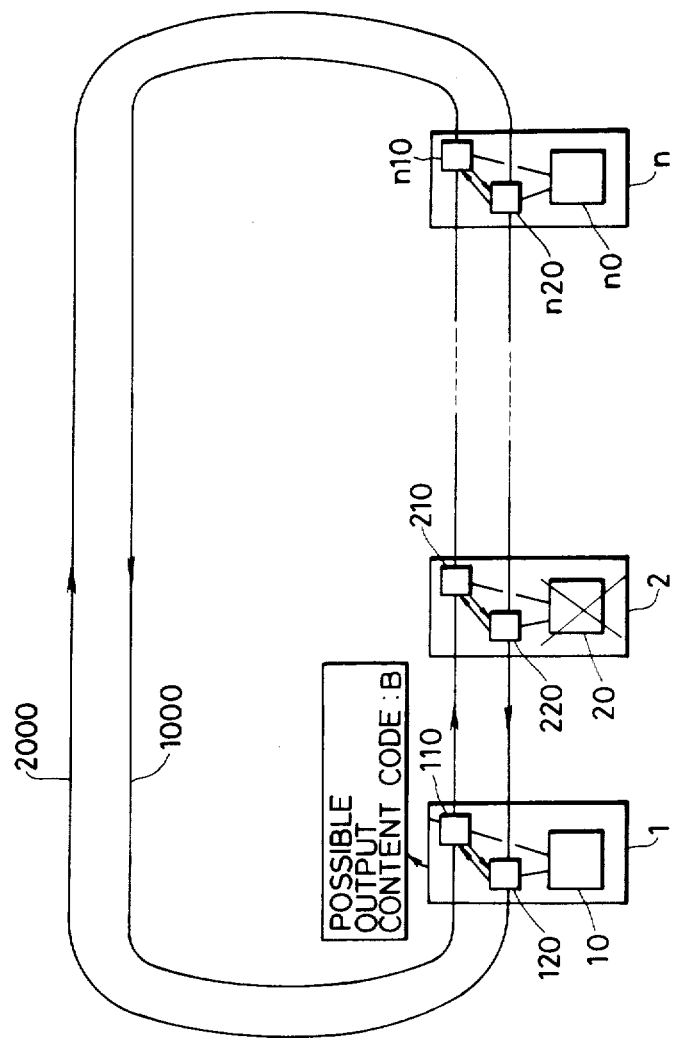
Figure 13:
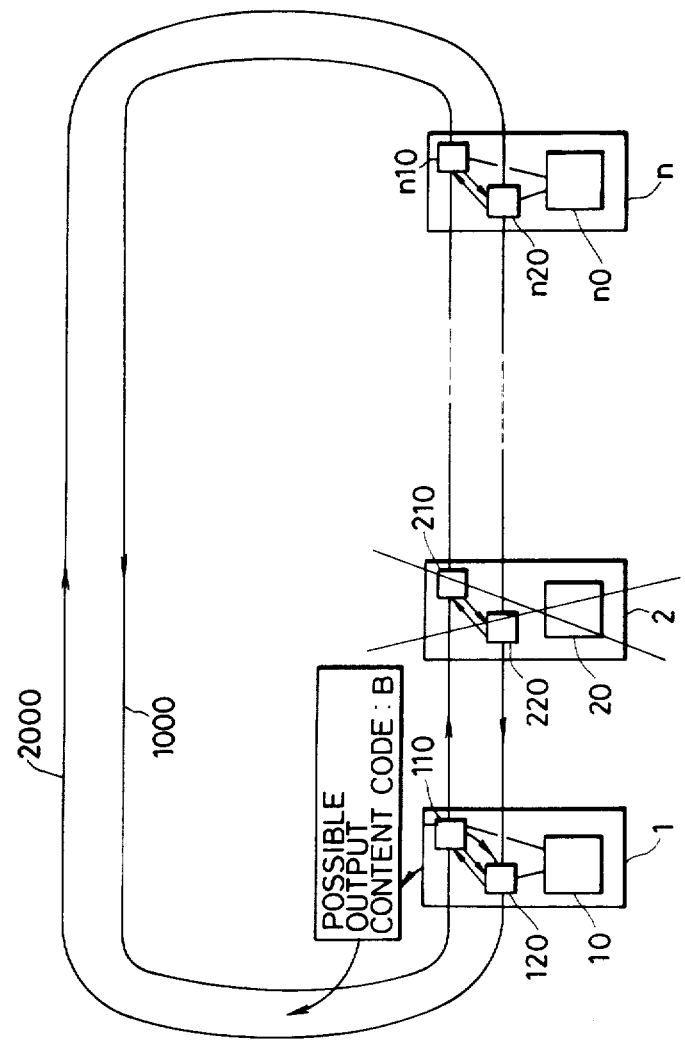
Figure 14:
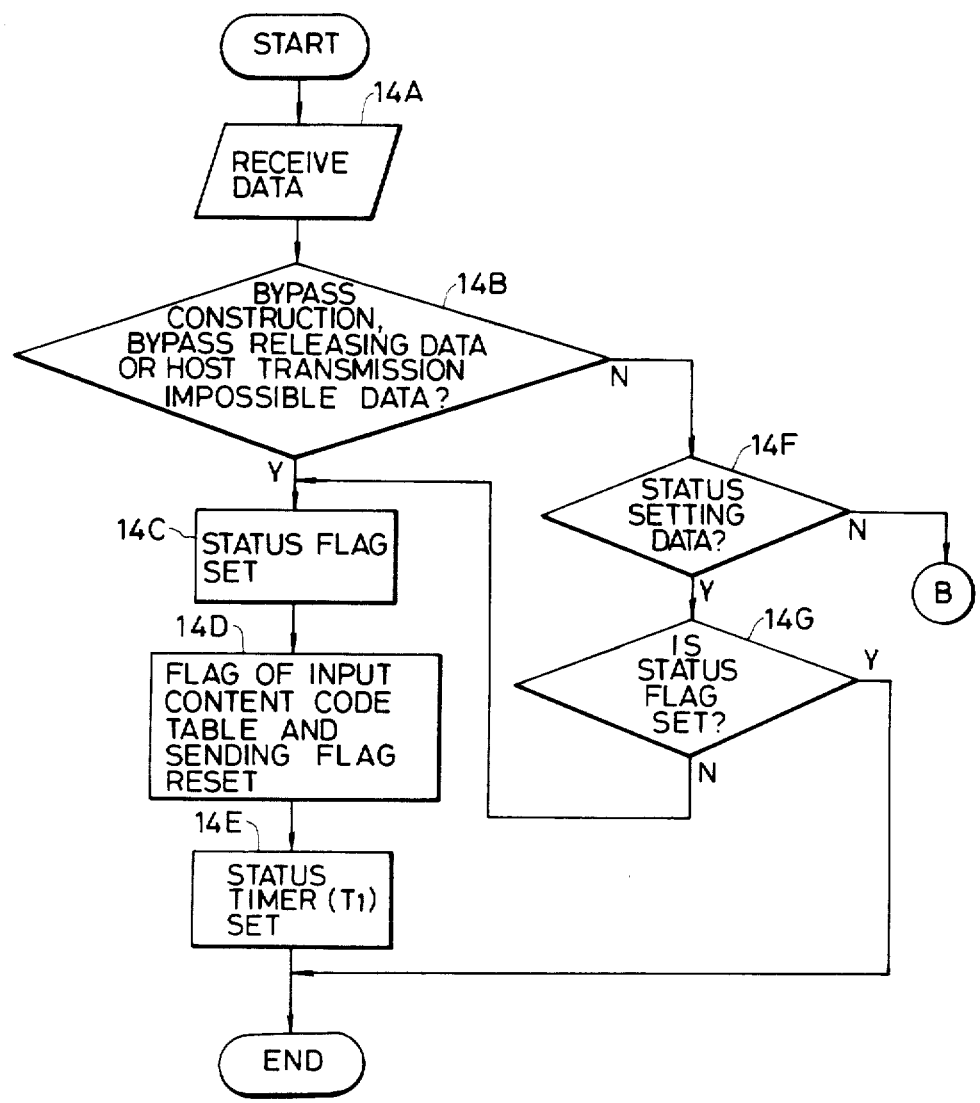
FIGS. 14 to 17 are detailed illustrations of the contents of the processings.
Figure 15:
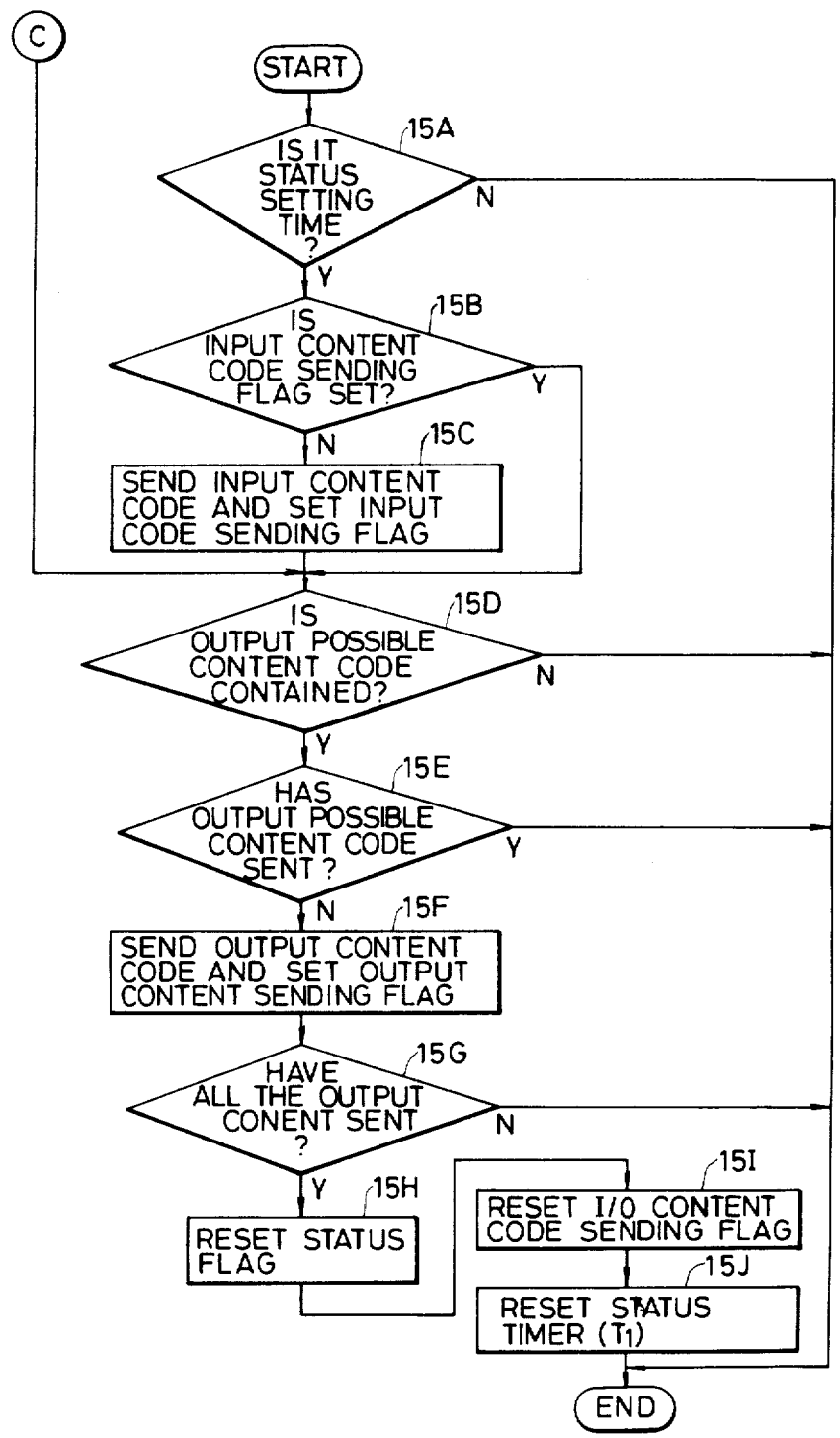

FIGS. 12 and 13 show, respectively, a case where a failure has occurred in the host processor 20 and a case where the subsystem 2 as a whole is failed. In these cases, the host processor 10 can perform the function $F_1$ as in the case explained in connection with FIG. 11. On the other hand, however, the host processors n0 is not able to execute the function Fn but conducts the fault time processing.

The detail of the processing performed by the host processor will be described hereinunder with reference to FIGS. 14 to 17.

Upon receipt of the data (14A) from the loop transmission system, the host processor 10 makes a judgement (14B) as to whether this data is to inform of releasing of the bypass route or to inform the impossibility of data transmission from the NCP to the host processor. If the data is other than those mentioned above, the host processor makes a judgement (14F) as to whether the data is to inform the status setting condition. If so, the host processor 10 judges (14G) whether the host processor 10 itself is ready for the setting of status, by means of the status flag in the status setting register 1008. If the status setting flag has not been set, the host processor 10 operates to set (14C) this flag and resets the flag in the input content code table repesenting the available input code in the I/O content code table 1007, as well as the sending flag which represents whether the required input content codes have been sent to the NCP 110,120. Then, the host processor 10 sets (14E) a status setting timer ($T_1$) for counting the time lapsed after the start of the status setting condition. If the judgement (14B) proved that the data is one of the above-mentioned data, the operation should proceed to the status setting condition. To this end, the flag in the status setting register 1008 is set (14C).

As the flag in the status register 1008 is set (15A), the host processor 10 consults (15B) with the input content code sending flag which represents whether the required input content code is sent to the NCP 110, 120. As explained before, the input content code sending flag is in the I/O content table 1007. If this flag is not set, the host processor 10 operates to send the input content code to the NCP 110,120 and sets (15C) the same flag. Thereafter, the host processor 10 checks (15D), by means of the input content code flag, the input content code which are available from other subsystems. If all of the input content codes required for the realization of the function $F_1$ are available (15E), the host processor selects the corresponding output contents codes from the I/O content table 1007 and sends the selected codes, while setting (15F) such codes as being "already sent" in the I/O content table 1007. If all of the required input content codes are available and all of the corresponding possible output content codes have become "already sent" (15G), the host processor 10 has completed the status setting, so that it resets (15H) the status setting flag and resets (15I) the input and output content codes sending flags, while resetting (15J) the status setting timer ($T_1$) 1010.

Figure 16:
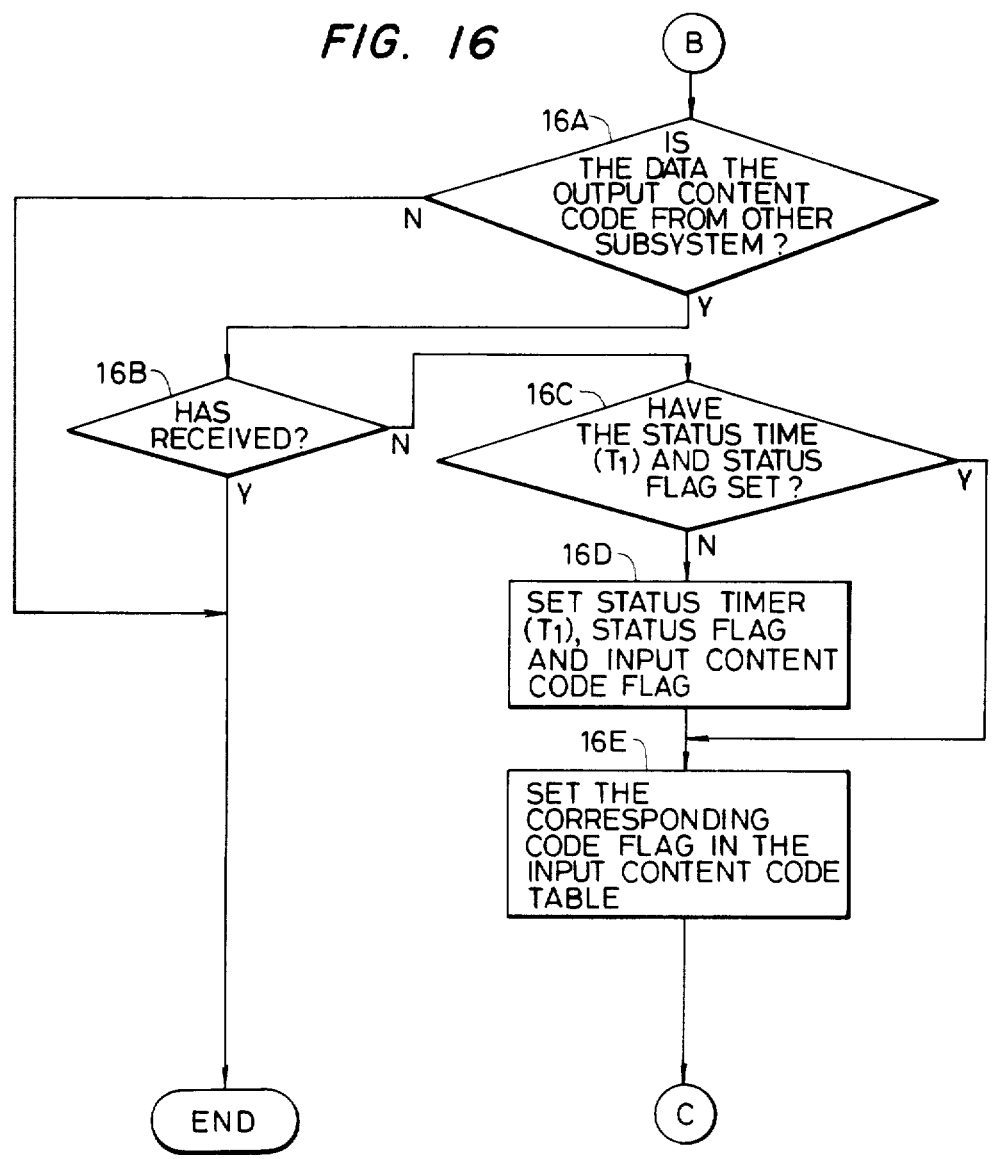

FIG. 16 shows the flow of the process conducted by the host processor when the same has received available content codes transmitted by the host processors of other subsystems. When other host processors have been put into the status setting state, the host processor 10 receives (16A) the available output content codes delivered by other host processors, and the host processor 10 judges (16B) whether the signal has been received already or not, by checking the input content code flag in the I/O content table 1007. If the received output content code proved not to be identical with the one which has been received already, a check is made (16C) as to whether the flags of the status timer ($T_1$) 1010 and the status register 1008 have been set. In the event that these flags have not been set yet, the host processor 10 sets these flags and resets (16D) the flag of the input content code in the I/O content code table 1007. Then, the host processor 10 operates to make the output content codes from other subsystems to the input content codes required by the subsystem to which the host processor belongs, and sets (16E) the flag in the corresponding input content code witin the I/O content table 1007.

Figure 17:
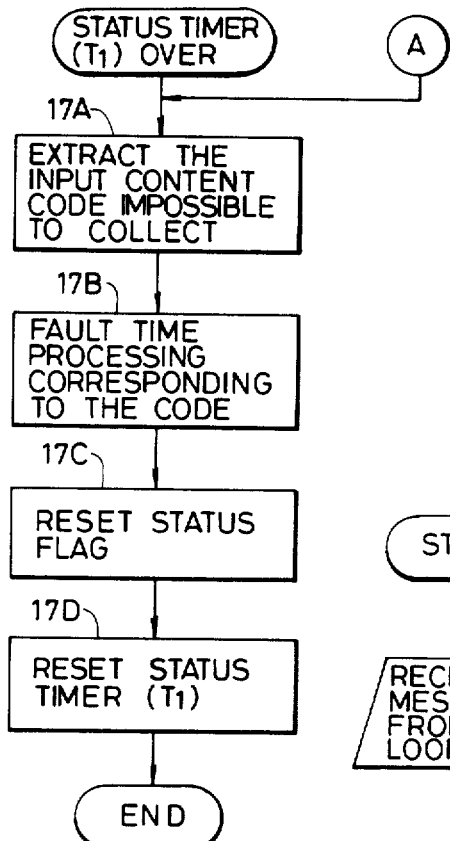

FIG. 17 shows the process which is taken when one or more of the input content codes required by the host processor could not be obtained. After the elapse of a predetermined time from the commencement of the status setting condition, an interruption is made by the timer $T_1$ and the input content code impossible to collect is extracted (17A) from the I/O content code table 1007. The host procesor 10 then finds out the function which cannot be executed due to the impossibility of collection of the input content code, and conducts (17B) the fault time processing. If any output content code to be sent is found as a result of the fault time processing, such code is sent to the loop. After the completion of this processing, the status flag is reset (17C) and the status timer ($T_1$) 1010 is reset thereby to complete the status setting. In FIG. 17, the step designated at A is connected to the processing step 61 shown in FIG. 6.

An explanation will be made hereinunder as to the synchronous control which is the other major function of the system in accordance with the invention.

(2) Synchronous control

It is assumed here that the subsystem 1 is required to perform work $J_1$ concurrently with the subsystems 2 to n. In this case, the subsystem 1 performs the following processing in order to obtain the matching of time with other subsystems. Namely, the host processor 10 delivers to the loop transmission line a message having a data consisting of the processing content $J_1$ and a synchronization request code $F_1$ representing that this content should be executed in synchronism, in the form of the aforesaid message format 3000. Each NCP on the loop then takes up this message and delivers the same to the associated host processor. Consequently, the host processor stops the further delivery of the data to the loop transmission line, so that no data flows at all through the loop.

Figure 19:
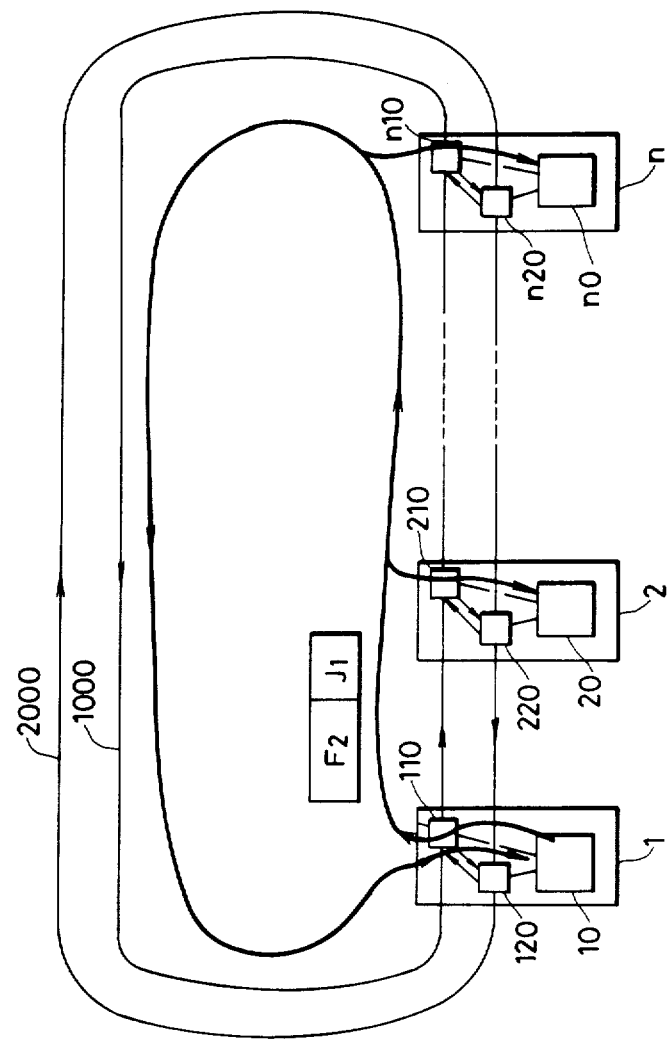

When there is no bypass route in the loop transmission line and the flow of data is extinguished in the loop, the host processor 10 delivers to the loop a message having data consisting of the synchronized processing content $J_1$ and the synchronization code $F_2$ in the form of the aforesaid message format 3000. (See FIG. 19)

The host processor which is to be synchronized and bound to conduct the processing $J_1$ commences the processing without delay after the receipt of this message. The detail of the processings made by the NCP and the host processor will be explained in detail hereinunder.

Figure 20:
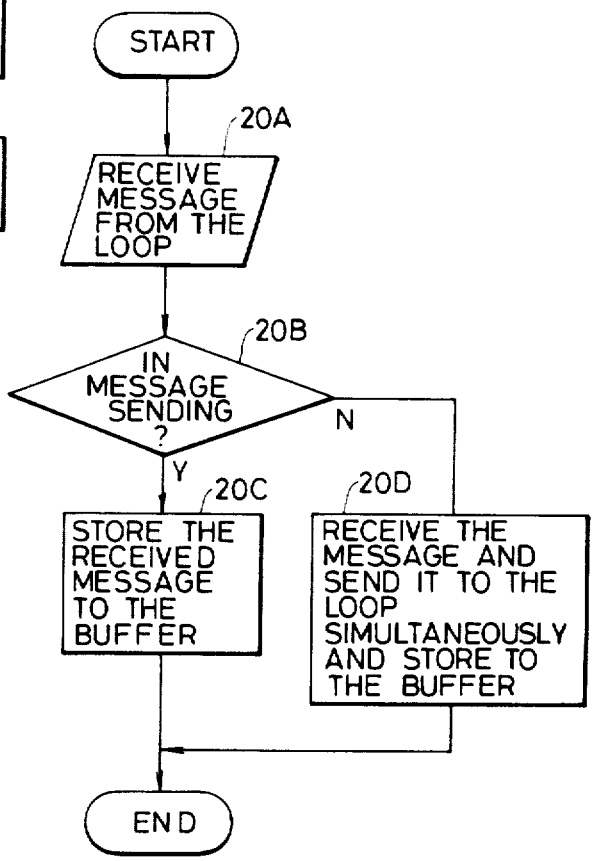
FIGS. 20 to 25 are detailed illustrations of the contents of the synchronous control processing.
Figure 21:
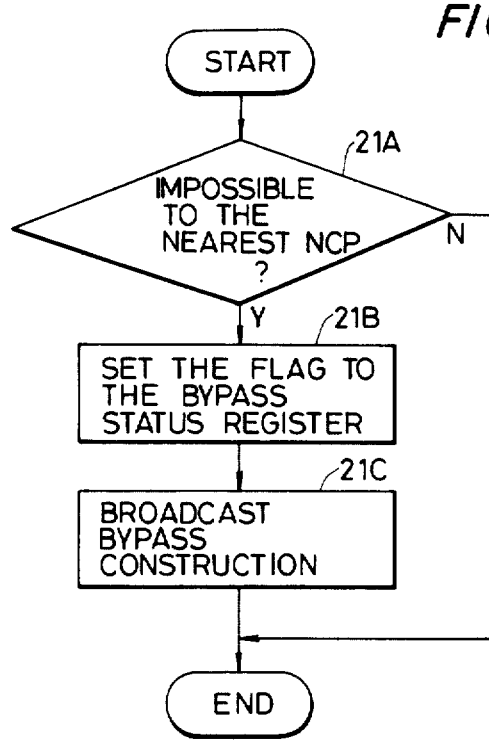
Figure 22:
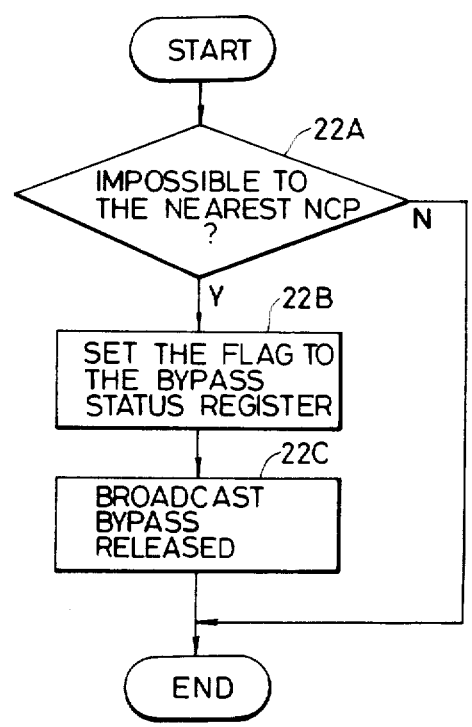

FIGS. 20 to 22 show the flow of control of input and output between the NCP 110 and the loop transmission line 1000. When buffers 104 and 1105 hold messsages which are to be sent to the loop transmission line, the processsing unit 1101 controls the circuit of the interface 1102 and sends to the processing unit 1101 the data which has been delivered from the loop transmission line 1000 to the interface 1102. On the other hand, when the buffers 1104 and 1105 have no message to be sent, the processing unit 1101 controls the interface 1102 so as to form a bypass route which permits the received message to be delivered directly to the loop transmission line.

Assume here that a message has arrived (20A) at the interface 1102 from the loop transmission line 1000. If the interface 1102 is already sending the message, the message received from the loop is stored (20C) in the receiving buffer 1104. If the message is not being sent, the message received from the loop is directly sent to the loop and taken up (20D) by the receiving buffer 1104. In this taking up processing, the transmission delay is substantially nullified because the message sent by the loop is not stored in each NCP.

A supplementary explanation will be made here as to the bypass route constructing function of the NCP. Namely, the NCP 110 detects a failure in the transmission line and constructs a bypass route in a manner shown below. If the message transmitted from the NCP 110 is not returned to the NCP 110 in a predetermined period of time, the NCP 110 sends the same signal again. If this signal is not returned also, a small loop check signal is made to flow through a route constituted by the NCP 110, NCP 210, NCP 220, NCP 120 and the NCP 110, in order to check whether the message can be sent to the adjacent NCPs. At the same time, the NCP 110 informs the NCP 120 of the commencement of the small loop check. In response to this information, the NCP 120 circulates a small loop check signal through a route constituted by the NCP 120, n20, n10, 110 and 120. If the small loop check signals are returned safely through respective small loops, the NCPs 110 and 120 which produced the small loop check signals regard the adjacent NCPs as being safe. Similarly, the NCPs 210, 310, . . . , n20 make the small loop check by generating respective small-loop check signals. If the small loop check signal is not returned, the NCP regards the adjacent NCPs as being defective and constructs the bypass route. Assuming here that the NCP 210 and 220 are defective as assumed before in connection with FIG. 11, the failure is detected by the adjacent NCPs 110 and 320 and a bypass route is constructed by these NCPs. On the other hand, the NCPs 110 and 320 periodically transmit large loop check signals besides the aforesaid small loop check signals, in order to detect the recovery of the failure. The large loop check signal is circulated through a route constituted by the inner loop 1000 or the outer loop 2000. If the small loop signal or the large loop signal, which has not been returned, has returned, the NCP which is producing such check signal regards that the failure has been eliminated and dismisses the bypass route.

As shown in FIG. 21, the NCP which has detected the failure through the small loop check and constructed (21A) the bypass route sets (21B) a flag in a bypass status register 1108 and sends (21C) a message to inform the other subsystem of the construction of the bypass route.

To the contrary, when the failure has been eliminated, the bypass route is dismissed (22A) and, at the same time, the flag in the bypass status register 1108 is reset (22B) and informs (22C) the dismissal to other subsystems. The NCP sends the change of the bypass status register 1108 to the host processor at each time such a change occurs. The host processor then sets the bypass information in the bypass status table 1011.

Figure 23:
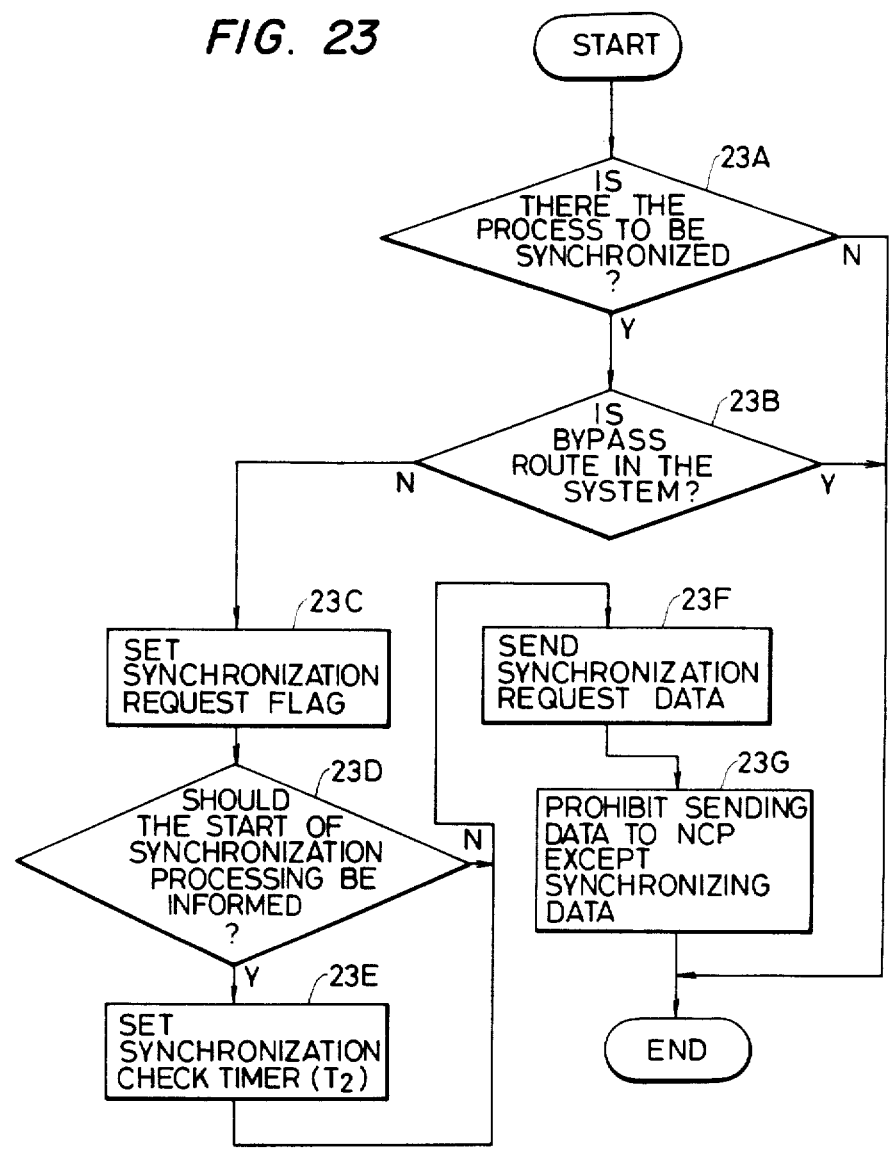
Figure 24:
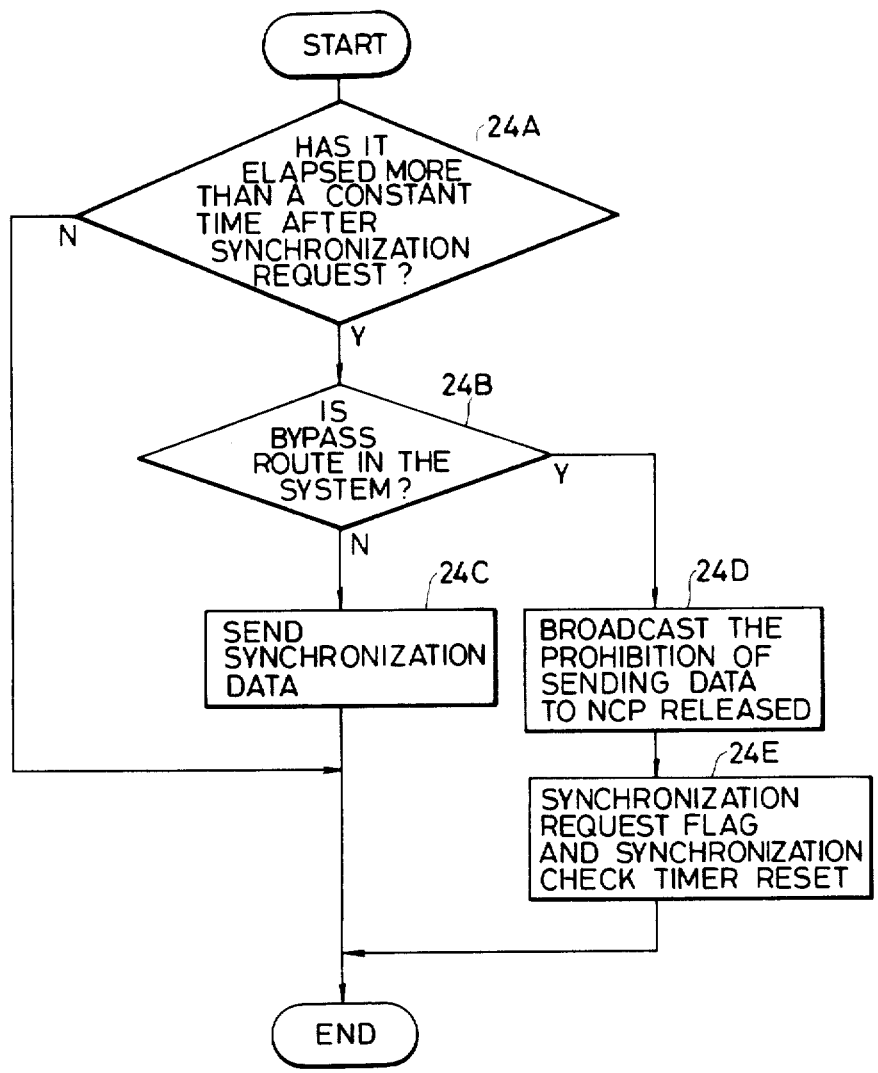
Figure 25:
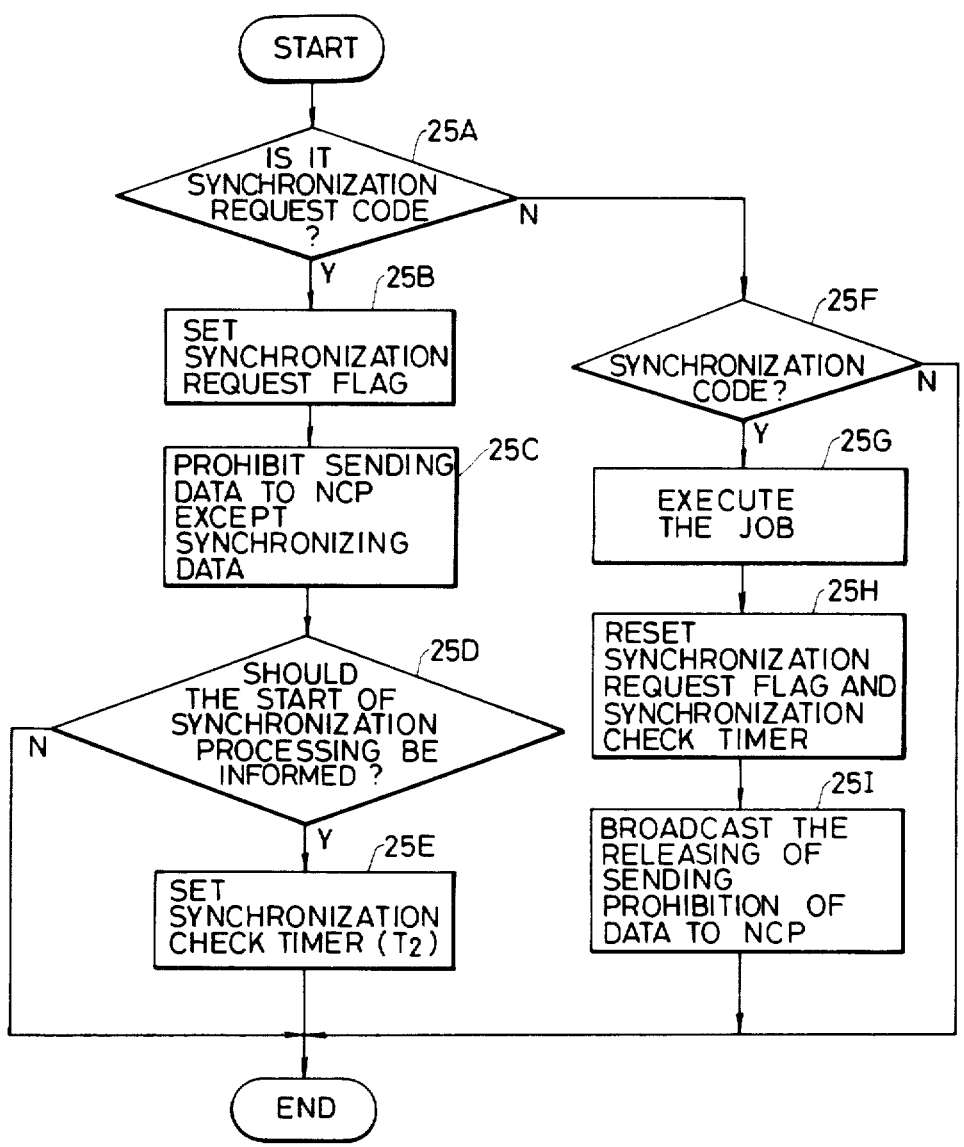

The host processor conducts a processing as shown in FIGS. 23 to 25 using the above-described function of NCP. When work to be conducted in synchronism has occurred (23A), a check (23B) is made to confirm whether there is a bypass route in the system. If there is no bypass route in the system, the flag in the synchronization request register 1009 is set (23C) and the synchronization request data is delivered (23F), while the sending of data other than the syncronization request data is prohibited (23G).

On the other hand, the host processor which has received (25A) the synchronization request data operates to set (25B) the flag in the synchronization request register 1009, and the sending of all other data than the synchronizing data to the NCP is prohibited (25C). After the transmission of the synchronization request data for the work $J_1$ to be conducted in synchronism, the host processor (23D,25D) which are expected to inform the commencement of the work operate to set (23E,25E) a synchronization check timer $T_2$. After a predetermined time has passed (24A) since the time of setting of the timer $T_2$, a check is made (24B) to confirm whether there is a bypass route in the system by means of the bypass status table 1011, and synchronizing data informing of the commencement of the processing of the work $J_1$ is transmitted (24C). If there is any bypass route in the system, the data on the loop is temporarily stored in the NCP constructing the bypass route, so that there is a negligible transmission delay. Under this circumstance, it is impossible to conduct the synchronous processing of the work $J_1$. Therefore, the prohibition of data transmission to the NCP is dismissed and this fact is informed (24D) to other host processors, thereby to reset (24E) the synchronization request flag and the synchronization check timer. The host processor (25F) which has received the synchronizing data immediately commences (25G) the work $J_1$ represented by this data, and resets (25H) the synchronization check timer ($T_2$) 1013 and dismisses the prohibition of sending of the data to the NCP to inform (25I) other host processors of this fact.

The host processor which has been prohibited to send the data to the NCP in order to prepare for the synchronizing processing operates, upon receipt of this prohibition dismissal data, to reset the register 1009 requesting the synchronization and the timer ($T_2$) to judge that the synchronizing processing is suspended.

Although in the described embodiment a plurality of subsystems are connected through a double loop transmission line, such an arrangement is only illustrative and the invention can be embodied in various other forms.

It is also advisable that a reference is preferably made to "Loop Transmission System" (Japanese Patent Application No. 93924/1980), "Transmission Controller" (Japanese Utility Model Application No. 87835/1981) of the same aplicant, as to the detail of operation of the devices such as NCP, host processor and so forth employed by the described embodiment.

Effect of the Invention

As has been described, the invention provides a decentralized processing system having a plurality of subsystems of the same order and connected to one another, wherein the improvement comprises that each subsystem has a diagnosis means for diagnosis of failure in other subsystems, and a function to take a suitable countermeasure in response to the result of the diagnosis, each of the subsystems further having means for controlling the application of the countermeasure in synchronism with one another.

Therefore, in the event of a failure in any one of the subsystems constituting the decentralized processing system, each subsystem can conduct a suitable fault time processing in accordance with the state of the failure and, after the recovery from the failure, each subsystem conducts a suitable processing in response to the recovery. In addition, the subsystems can conduct the works in synchronism as the occasion demands. Thus, the decentralized processing system of the invention is novel and can produce a remarkable effect.

What is claimed is:

1. A decentralized processing method in a system having a plurality of subsystems, each subsystem being coupled to the other subsystems by at least one transmission means and performing processing of an assigned function comprising the steps:

each subsystem checking whether all of one or more informations required for execution of the assigned function of that subsystem are available from other subsystems over said at least one transmission means; and each subsystem executing its assigned function only when all of the one or more informations required to perform its assigned function are available.

2. A decentralized processing method according to claim 1 wherein each subsystem executes its checking by processing content codes which represent contents of each of the one or more informations.

3. A decentralized processing method according to claim 2 wherein said checking is executed during a status setting period in which content codes from other subsystems are received.

4. A decentralized processing method according to claim 1 in which each of said subsystems executes a fault time processing routine to identify a failure anywhere within the system.

5. A decentralized processing method according to claim 4 wherein each of said subsystems executes the steps of receiving the result of the fault time processing routine of the other subsystems and executes its fault time processing routine utilizing the results of the fault time processing routines of the other subsystems.

6. A decentralized processing method according to claim 1 wherein the at least one transmission means is connected to the subsystems to form a loop and each subsystem functions to diagnose a failure in any of the other subsystems.

7. A decentralized processing method in accordance with claim 6 wherein:

each subsystem detects a failure in a transmitting function of the other subsystems by the operation of the subsystem to detect a data transmission failure;

one of the subsystems upon detection of a failure in a transmitting function constructs a bypass route within the failed system when a bypass route is possible;

the subsystem constructing the bypass route within the failed subsystem informs the other subsystems of the bypass route within the failed system; and one of the subsystems constructs a bypass route within a subsystem adjacent to the failed system when a bypass route within the failed system cannot be constructed.

8. A decentralized processing method in accordance with claim 1 wherein:

each subsystem prohibits the sending of data on the one or more transmission means other than data for synchronizing the operation of subsystems which have not failed during operation when the subsystems are synchronized with each other to perform synchronous processing.

9. A decentralized processing method in accordance with claim 1 wherein:

one of the subsystems prohibits the processing of a failed subsystem in synchronism with another subsystem when a bypass route of the failed system has been constructed.

10. A decentralized processing method in accordance with claim 1 wherein:

each of the subsystems sends a small loop check message to subsystems adjacent to a failed subsystem to check if data can be sent in a loop to which the failed subsystem and adjacent subsystem belongs.

11. A decentalized processing method in accordance with claim 1 wherein:
each of the subsystems sends a large loop check message to all of the subsystems in the system to check if data can be sent throughout the system.

12. In a decentralized processing system having a plurality of subsystems, each of the subsystems being coupled to the other subsystems by at least one transmission means and performing processing of a assigned function wherein each subsystem comprises:
a first memory for storing a plurality of content codes representing the contents of respective informations which are necessary for that subsystem to execute its assigned function;
a second memory for storing received content codes sent from the other subsystems;
processing means for comparing the content codes stored in said first memory means and the second memory means to judge that the assigned function inexecutable when all necessary content codes stored in the first memory have been found in the second memory; and
means for executing the assigned function when all codes in the first memory have been matched with codes in the second memory.

13. A decentralized processing method in a system having a plurality of subsystems, each of the subsystems being coupled to the other subsystems by at least one transmission means and performing processing of an assigned function comprising the steps:
each subsystem independently operating application programs in synchronism with other subsystems;
each subsystem checking the status of the transmission means to confirm that synchronous operation of the application programs is possible; and
operating the application programs when possible.

14. A decentralized processing method in accordance with claim 13 wherein the checking step checks whether there is a delay in the functioning for the synchronous operation.

* * * * *